(12) United States Patent
Madigan

(10) Patent No.: US 8,301,278 B1
(45) Date of Patent: Oct. 30, 2012

(54) MODAL ADVERTISING FOR WIRELESS DEVICES

(75) Inventor: Edwin F. Madigan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1314 days.

(21) Appl. No.: 11/614,347

(22) Filed: Dec. 21, 2006

(51) Int. Cl.
*G06F 17/00* (2006.01)
*H04H 40/00* (2008.01)
(52) U.S. Cl. .......................................... 700/94; 455/3.06
(58) Field of Classification Search .................... 700/94; 455/3.06
See application file for complete search history.

(56) References Cited

U.S. PATENT DOCUMENTS 7,548,915 B2 * 6/2009 Ramer et al. ...................... 707/5

OTHER PUBLICATIONS

U.S. Appl. No. 11/464,248, Madigan, Jr.

* cited by examiner

*Primary Examiner* — Andrew C Flanders

(57) ABSTRACT

Methods and computer-readable media are provided for the delivery of digital content to mobile devices. An audio content, a video content or an audio-video content is associated with a web page and the web page is published to a server location suitable for viewing. Once the web page is selected, the content is sent to the wireless device through streaming or by initiating a download. After the content is available to the device, an application programming interface executes the content for the user to listen, view or both.

12 Claims, 5 Drawing Sheets

MODAL ADVERTISING FOR WIRELESS DEVICES

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

The present invention relates to delivery of digital content to mobile devices.

BACKGROUND

Advertising on the world wide web has brought a new vehicle with which companies can reach consumers in an attempt to sell products. Delivery of web applications to mobile communications devices, such as cell phones, personal data assistants (PDAs) and hybrid devices combining functions of both, provides a clear example of an emerging area for innovation in internet delivery. Wireless application protocol (WAP) allows for standardized coding of web content for wireless devices, which can include mobile communications devices.

The method used to serve content to the user, in addition to the type of content served, presents opportunities as well as difficulties. While users can browse the web in a relatively uniform manner because of WAP, the device's small user interface limits the page visually in a manner that desktop and laptop browsers do not encounter. Users must scroll up or down on a mobile communications device to read an amount of text that would be easily displayed on a single screen for a desktop or laptop computer. Often times on wireless applications, side to side scrolling is limited or non-existent which imposes another spatial hindrance. Because wireless devices primarily rely on text and basic graphics for the web-browsing experience, this restricts the amount of information an advertisement can convey without losing the interest of the user.

There also are features of this platform which can make browsing the web more difficult and therefore add challenges to the production of effective ads. There are limitations to navigation of the browser's web page because most devices in this category do not have a mouse input similar to a desktop or laptop computer. For example, in most cell phones, typically there are only one to two additional inputs besides the small keyboard or keypad included on the unit itself. These inputs are usually small two-direction or four-direction buttons, also built into the device, which allow for the user to scroll up and down or side to side.

However, use of digital content such as audio or video, which do not require user interaction once executed, help to overcome many of these problems. The amount of content is limited only by the file size of the content, rather than the display area. The difficulties of navigation are bypassed as well. As a result, wireless web advertising would be greatly improved a solution that delivers digital content that is more suited to the primary purpose of the device.

SUMMARY

The present invention is defined by the claims below. Embodiments of the present invention solve at least the above problems by providing, among other things, delivery of audio, video or audio-video content to a wireless device. The present invention has practical applications in the technical arts including improving effectiveness of advertising on internet pages browsed by a user employing a wireless device, as well as reducing restrictions on content by using audio or video media.

In a first aspect, a method provides for delivery of an audio content by receiving the content in computer-readable format, associating that content with a web page and publishing that web page to a server for viewing on the internet. In exemplary embodiments of the invention, the web page may be an advertising unit. In other exemplary embodiments, the content may be streamed to the device or downloaded to the device and may be executed automatically upon reception.

In another aspect, computer-readable media for performing a method of content delivery have instructions embodied thereon for identifying audio content in computer-readable format, associating that content with a web page and publishing that web page to a server. In exemplary embodiments of the invention, the web page may be an advertising unit. The content may be streamed to the device or downloaded to the device and may be executed automatically upon reception on other exemplary embodiments.

In another aspect, a method provides for delivery of a digital content by providing a web page to a wireless device, associating digital content to that web page and communicating the web page with associated digital content to the mobile device. In exemplary embodiments of the invention, the content may be audio, video or a combination of both, and may be executed automatically upon reception. In other exemplary embodiments, the web page may be an advertising unit.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
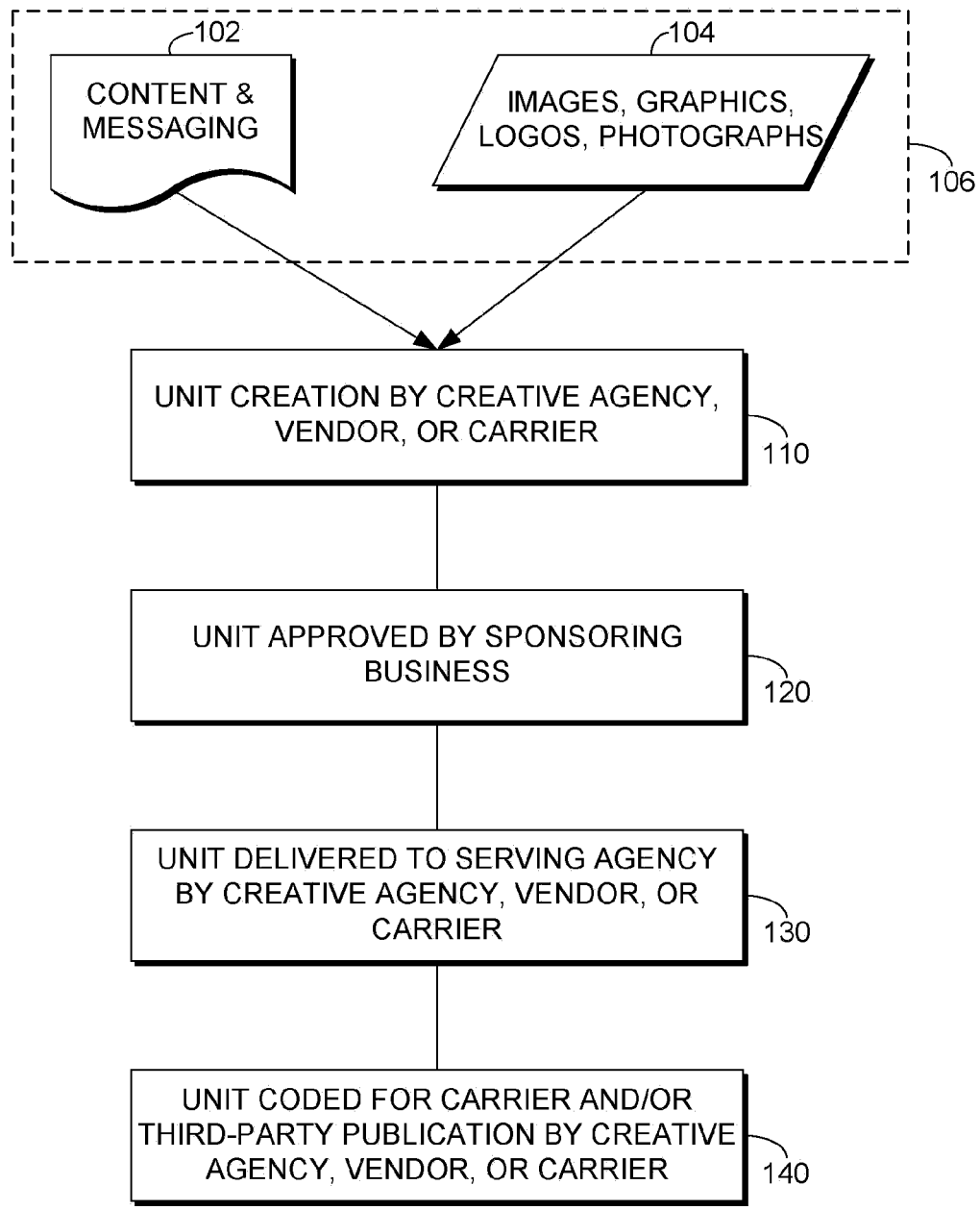
FIG. 1 is a flow diagram of the creation of an advertising unit in the present invention.

Embodiments of the present invention provide systems and methods for delivering content of an advertising unit in audio, video or audio-video format. Various technical terms are used throughout this description. A definition of such terms can be found in Newton's Telecom Dictionary by H. Newton, 21st Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies.

The overall process of creating an advertising unit for various media is a standard one whether the medium is print, broadcast or web-based. Despite this fact, the steps involved can be performed in a variety of sequences which depends largely on the infrastructure of the business that wishes to advertise, the corresponding structure of the creative group responsible for the ad, and the delivery method. There are varied relationships between these groups, as well as internal workings of these individual entities, which determine the exact process by which the original advertising concept reaches the public.

As shown in FIG. 1, there is a general process by which the ad makes its way from concept to public viewing. The advertisement is created when the specific content or message 102 is generated, and the associated visual elements 104 are selected to make up the elements of the advertising unit 106. Those elements are then combined to form the advertising unit in step 110. This can be completed by the sponsoring business or a creative agency outside of the sponsoring business. The initial ad unit 110 is then approved by the decision-making body or individual of the sponsoring business in step 120. If that person or group requires changes to the appearance or content of the ad, the changes are completed prior to completion of step 120 to finish the advertising unit.

The remaining portion of the advertising cycle shown in FIG. 1 is an overview of the transition from completed advertisement to publicly viewable material. The completed ad 120 is submitted in step 130 to a serving or publishing agency, which can be a printer, publisher, radio or television provider, conventional or wireless web server, wireless telecommunications carrier or wireless provider. A wireless telecommunications carrier or wireless provider includes those companies that operate voice networks and data networks to provide wireless telephone and wireless data systems for users. An example includes Sprint/Nextel® of Overland Park, Kans. In the case of a WAP advertisement, the ad unit is coded for the carrier or serving agency in step 140 to complete the cycle. The steps associated with FIG. 1 are applicable to advertisements created and displayed on wireless internet applications used by mobile communications devices. This can include such devices as web-enabled cell phones, PDAs and hybrid devices such as the Blackberry, produced by Research in Motion, Ltd., of Waterloo, Canada.

Figure 2B:
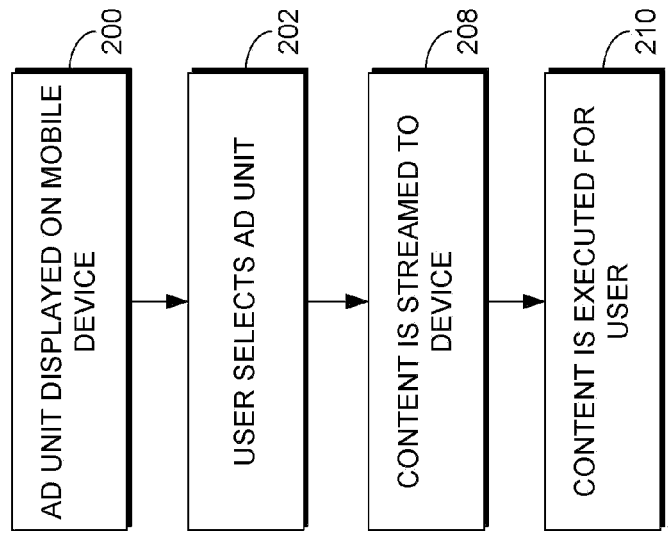
FIG. 2B is a flow diagram of an exemplary delivery of a content, without providing a jump page, by streaming the content to a user in another embodiment of the present invention.
Figure 2A:
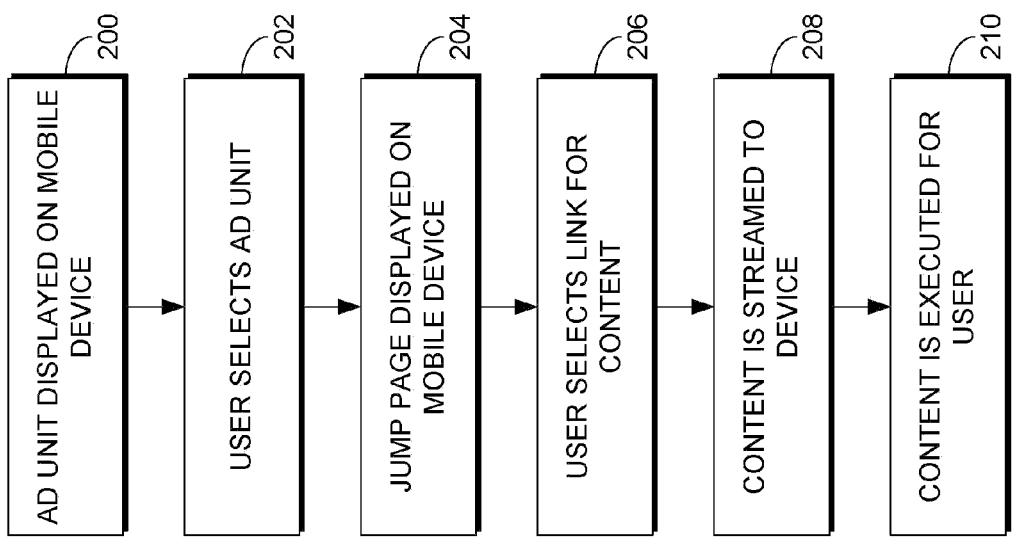
FIG. 2A is a flow diagram of an exemplary delivery of a content, after first providing a jump page, by streaming the content to a user in one embodiment of the present invention.

Turning to FIG. 2A, a completed ad unit is made available for mobile communications devices in step 200. A method of content delivery according to one embodiment of the present invention begins when the user viewing an ad unit in step 200 selects to navigate to the ad as shown in step 202. In a typical wireless application, a "jump" page is displayed as seen in step 204 after ad selection 202. Jump pages are used in a wireless-browsing environment to provide text-only or graphic-enabled pages as well as to show the links that are available for the user to navigate to another page. More details regarding jump pages and an exemplary figure is provided below in FIG. 5. A jump page allows the user to select from one or more links as seen in step 206. In embodiments of the current invention, a selection on the jump page 206 causes a digital content to be streamed to the mobile device as shown in step 208. The process is completed when an application programming interface on the device executes delivery of the content on the device in step 210. An embodiment of the invention is shown in FIG. 2B, wherein steps 204 and 206 are omitted. In this embodiment, once the ad unit selection 202 takes place, the content streaming 208 begins and the process proceeds with content execution without navigating to a jump page.

Figure 3B:
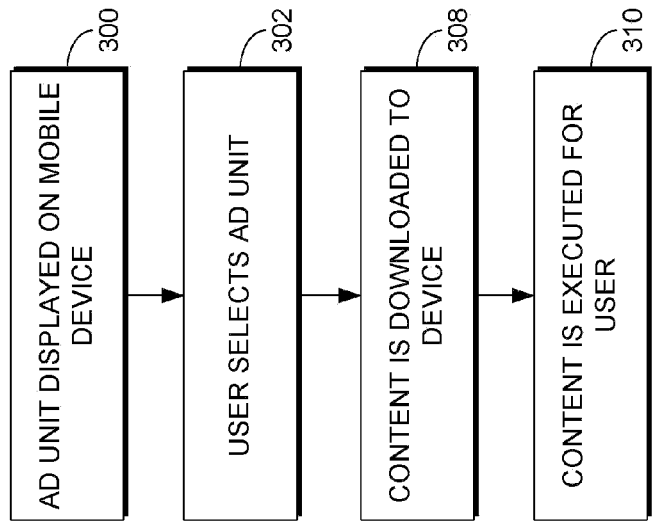
FIG. 3B is a flow diagram of an exemplary delivery of a content, without providing a jump page, by completing a download to a user in another embodiment of the present invention.
Figure 3A:
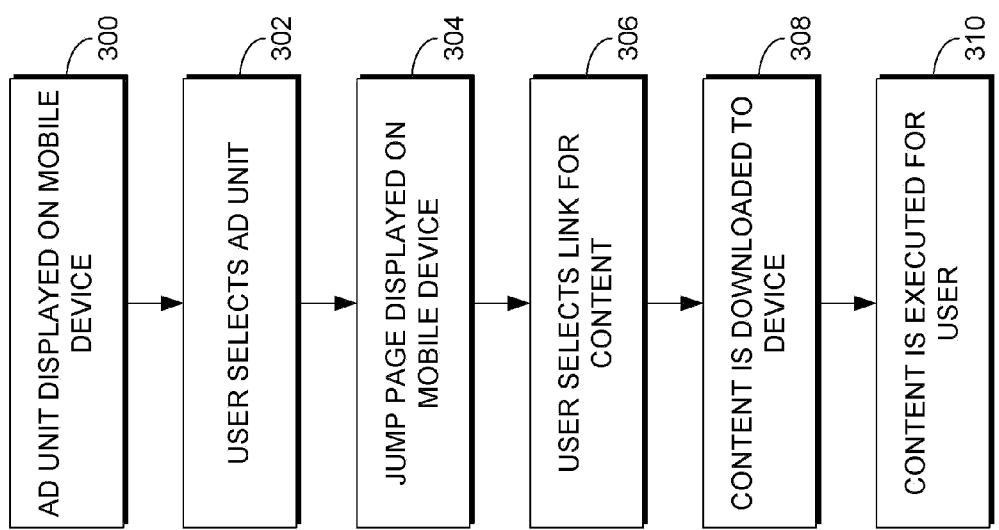
FIG. 3A is a flow diagram of an exemplary delivery of a content, after first providing a jump page, by completing a download to a user in another embodiment of the present invention.

Another method of content delivery can be performed as shown in the flowchart of FIG. 3A. The process begins similarly to the previous processes with display of the ad unit on the mobile device 300. The user selects the ad unit as seen in step 302 and a jump page is displayed in step 304. Rather than commencing a streaming step, selection of a link on jump page 306 will initiate a download of content to the mobile device in step 308. A download is understood to be the transfer of a file from the server to the mobile device. As shown in step 310, once the download is complete and the file has been transferred, the content is executed by an appropriate application on the mobile device. In another embodiment, FIG. 3B shows a method omitting steps 304 and 306. Instead of leading to a jump page, user selection 302 leads directly to download initiation 308.

Figure 4:
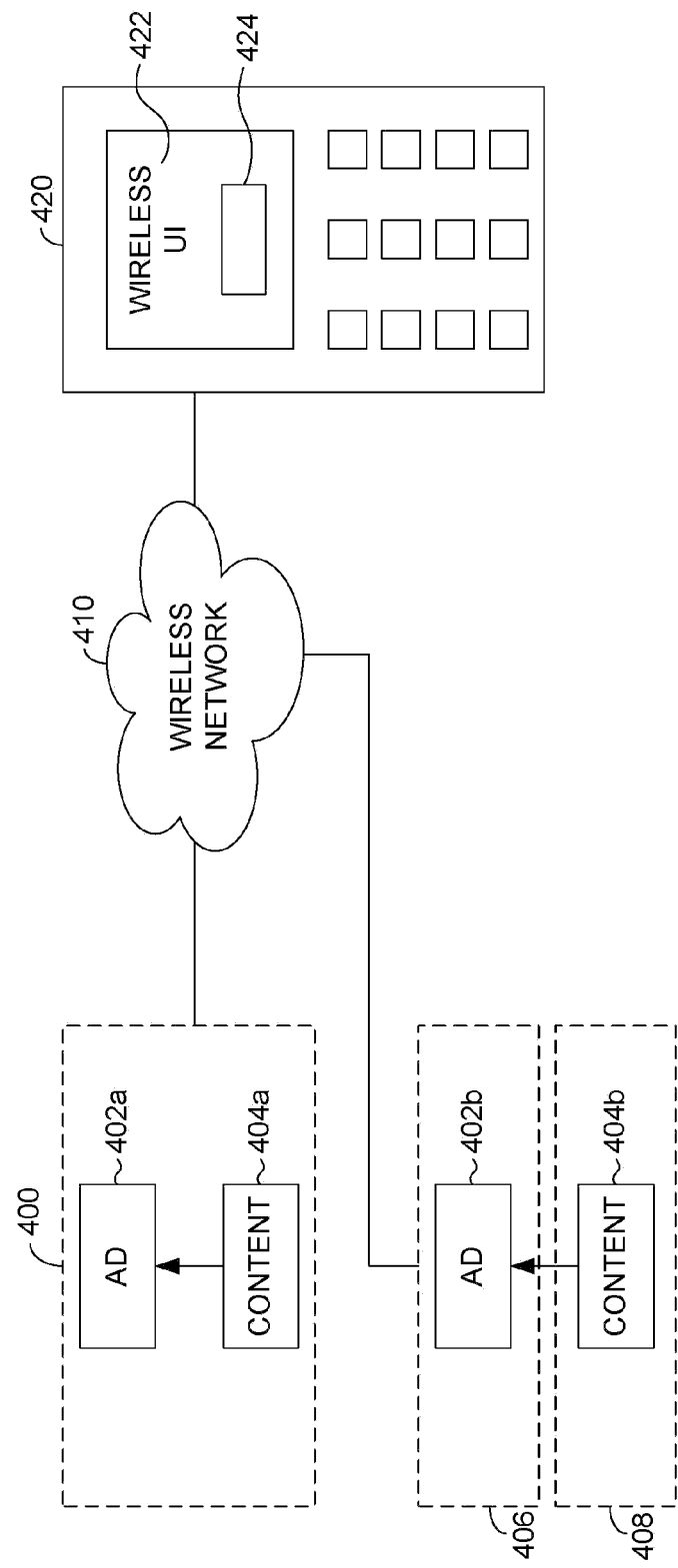
FIG. 4 is a block diagram depicting an exemplary embodiment of the present invention.

As seen in FIG. 4, exemplary embodiments can be implemented with an ad unit, a network, and a mobile device. Ad unit 402a is associated with digital content 404a at server 400. Wireless network 410 is used to transfer ad unit 402a to mobile device 420. Wireless network 410 may be made up of a combination of computers, servers, modems, routers, switches, relays, transmitters, receivers, transceivers and other devices necessary for the wireless transmission of voice or data. The mobile device's user interface 422 creates on-screen display of the ad unit 424. Selection of ad unit 424 leads to various results. Content 404a may be streamed across network 410 to device 420. Alternatively, content 404a may be delivered to device 420 in a completed download and then executed at device 420. In both instances, an application programming interface on device 420 will execute an application that allows the user to listen to or view the content. As can be appreciated by one skilled in the art, the ad unit and digital content need not reside at the same location or on the same server. In an alternative embodiment, ad unit 402b may reside on server 406 and content 404b associated with ad unit 402b may reside on server 408. The difference is transparent to the user, as selection of ad unit 424 still leads to streaming or downloading of content 404b.

Figure 5:
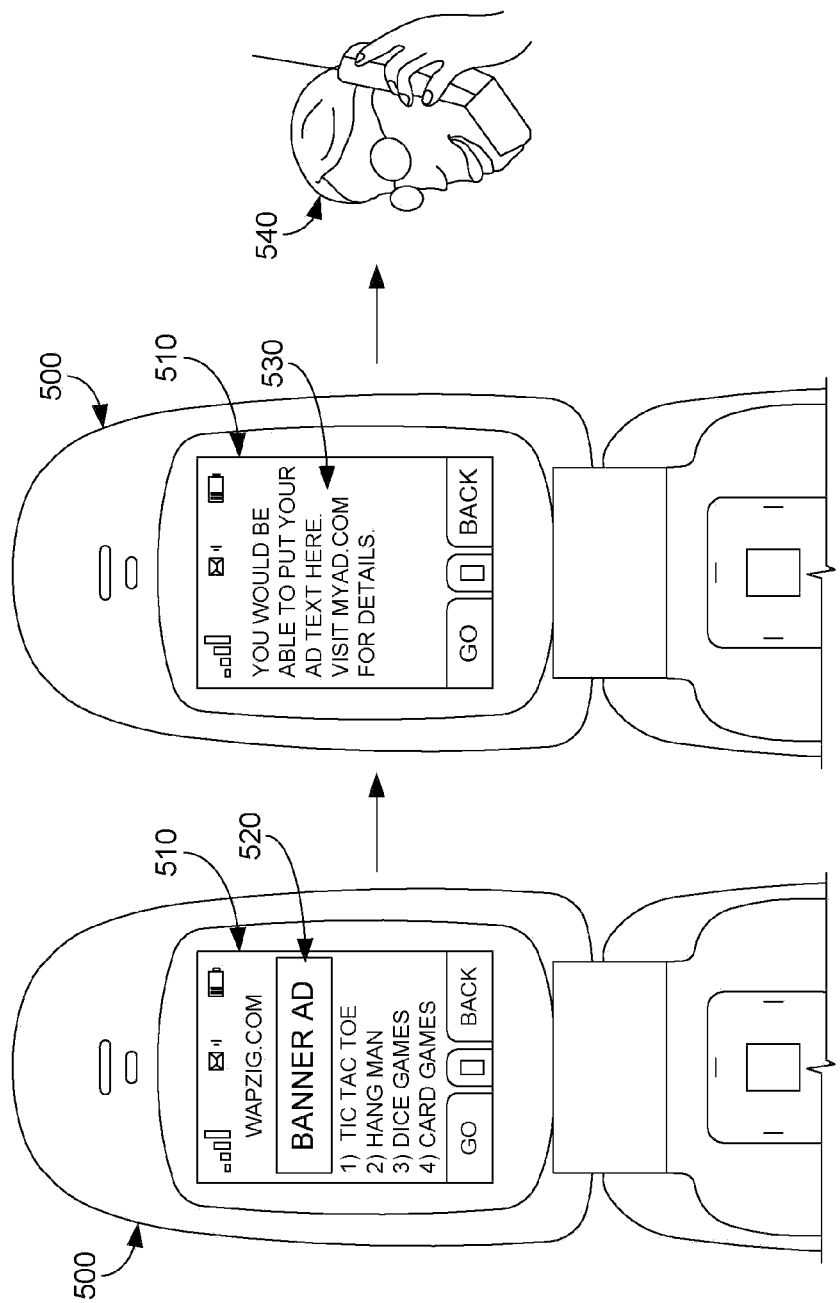
FIG. 5 is an illustration depicting an exemplary embodiment of the present invention.

FIG. 5 is an exemplary embodiment of the present invention and shows various ways in which the user's browser experience can be improved. According to the figure, device 500 with user interface 510 includes ad unit 520. Selection of ad unit 520 would result in the device 500 displaying jump page 530, which includes text content. Selection of a link or prompt on jump page 530 would result in the execution of an audio content for the user as shown by 540. The audio content shown in 540 could be streamed to the user for real-time or near-real-time execution or could be downloaded to the user's device and then executed once the download is complete.

There are a number of ways that a user's web-browsing experience can be enhanced with the use of the present invention. The most direct is the ability to send a greater amount of content to the user without the user losing interest. Rather than scrolling through endless pages of text that contain only a small portion of the overall content message, the entire content message can be implemented in one selection by the user. To provide a more interactive experience, smaller segments of the ad content may be streamed or downloaded by the device so that audio or video is executed as the user moves through the ad, whether in a static or dynamic form. The former enhancement merely allows for an audio content to be executed when the ad is selected. The latter exemplary improvement is the ability to stream small "sound bites" as browser focus passes over banner ads, which could provide audio in a variety of attention-grabbing forms. Similar enhancements are possible with small video clips rather than simply audio. In another alternative embodiment, the final portion of the ad content could provide a message encouraging the user to call the advertising sponsor's phone number. The ability to select a button on the mobile communications device and have the company's phone number automatically dialed could also lead to more effective use of ad space and time.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of providing an audio content for delivery through one or more networks to a mobile communications device with a web browser, said method comprising:
receiving said audio content in a computer-readable format;
associating said audio content with an ad unit within a web page based on the audio content comprising at least a portion of an advertising content of said ad unit, wherein associating said audio content with said ad unit within said web page includes associating each of a plurality of segments of said audio content with a respective instance of a plurality of instances within said ad unit, and wherein only one instance of said plurality of instances within said ad unit is displayed on said mobile communications device at any given time;
publishing said web page with said ad unit and said audio content to a server; and
communicating said web page to said mobile communications device by a wireless web carrier or wireless provider, and
wherein when said ad unit is displayed an audio interface is automatically executed within said web browser to play said segment of said audio content for said respective instance within said web page on said mobile communications device, said audio content providing at least a portion of the advertising content for said ad unit.

2. The method of claim 1, wherein said web page is an advertising unit.

3. The method of claim 1, wherein said web page includes a link to access said audio content.

4. The method of claim 1, wherein said audio content is delivered by streaming said audio content through said one or more networks.

5. The method of claim 1, wherein said audio content is delivered by downloading a file to said mobile communications device through said one or more networks.

6. One or more non-transitory computer-readable media having computer-useable instructions embodied thereon for performing a method of providing an audio content for delivery to a mobile communications device with a wireless web browser, said method comprising:
identifying said audio content in a computer-readable format to associate with an ad unit within a web page;
associating said audio content with said ad unit within said web page based on said audio content comprises at least a portion of an advertising content of said ad unit, wherein associating said audio content with said ad unit within said web page includes associating each of a plurality of segments of said audio content with a respective instance of a plurality of instances within said ad unit, and wherein only one instance of said plurality of instances within said ad unit is displayed on said mobile communications device at any given time;
publishing said web page to a server; and
communicating said audio content to said mobile communications device through a wireless web carrier or wireless provider,
wherein said segments of said audio content are automatically executed by an audio interface within said web browser to play said audio content on said mobile communications device when said respective instance of said plurality of instances within web page is presented to a user.

7. The media of claim 6 wherein said web page is an advertising unit.

8. The media of claim 6, wherein said audio content is available at said mobile communications device by selecting a link.

9. The media of claim 6, wherein said audio content is streamed to said mobile communications device.

10. The media of claim 6, wherein said audio content is loaded as a file on said mobile communications device.

11. A method for providing a digital content for delivery through one or more networks to a mobile communications device, said method comprising:

providing said digital content in a computer-readable format from a server to said mobile communications device through said one or more networks, wherein said one or more networks include one or more wireless networks;

associating said digital content with an advertising unit within a web page displayed at said mobile communications device wherein said digital content is associated with said advertising unit within said web page in said server or said digital content is associated with said advertising unit within said web page in said mobile communications device, wherein associating said digital content with said advertising unit includes associating each of a plurality of segments of said digital content with a respective instance of a plurality of instances within said advertising unit, and wherein only one instance of said plurality of instances within said ad unit is displayed on said mobile communications device at any given time; and communicating said web page with said advertising unit and said digital content to said mobile communications device, wherein each of said segments of said digital content is automatically executed by one or more interfaces available on said mobile communications device when said respective one of said plurality of instances in said web page is displayed by said mobile communications device, and wherein said digital content includes one or more of audio and video content and comprises at least a portion of an advertising content of said advertising unit.

12. The method of claim 11, wherein said communicating step comprises receiving a selection of a link to begin communicating said web page.

* * * * *